9763X
J. C. WOOD.
MACHINE FOR RAISING WATER.
Patented June 22, 1836.
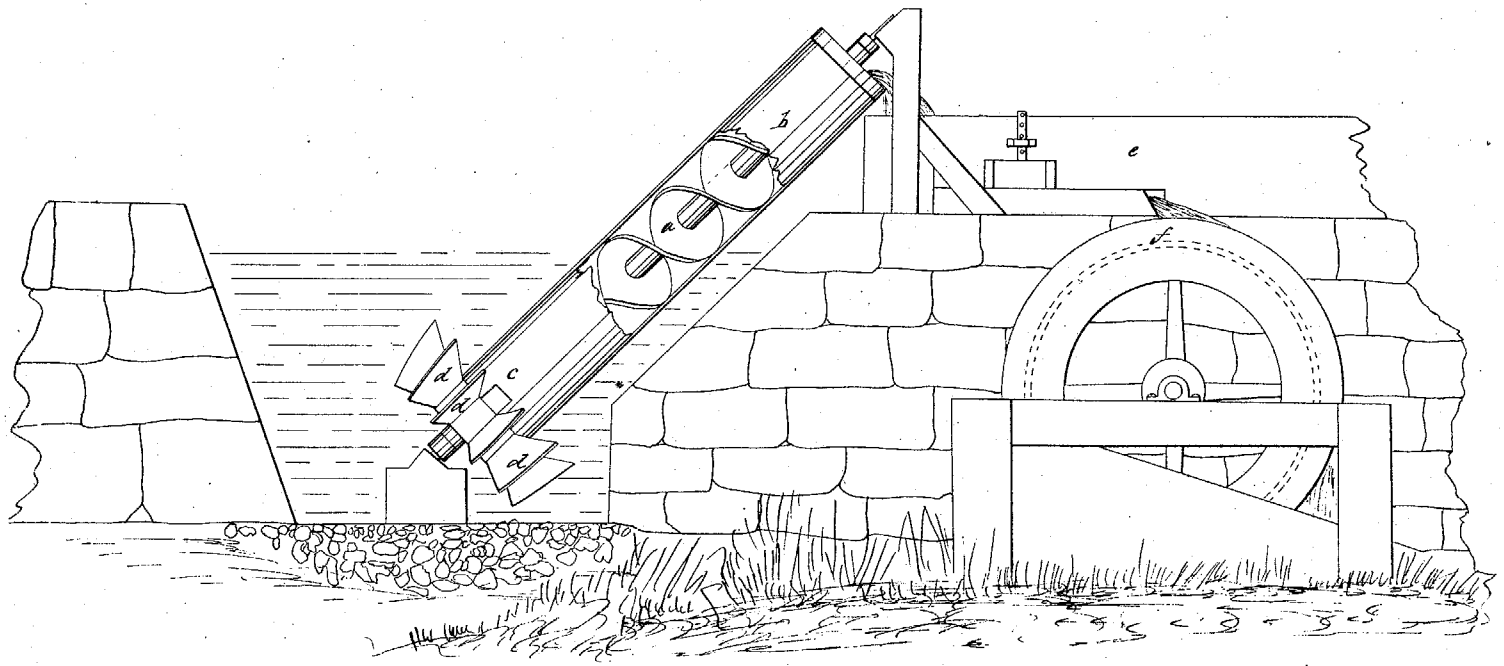
THE NORRIS PETERS CO., PHOTO-LITHO., WASHINGTON, D. C.

[illegible]
June 22, 1836

Jesse C. Wood of Euphrata. New York

Letters Patent.

The schedule referred to in these Letters Patent and making part of the same containing a description in the words of the said Jesse C. Wood himself of his improvement in the machine for raising Water for propelling machinery and for other purposes Be it known that I Jesse C. Wood of Euphrata in the County of Montgomery and State of New York have invented a new and useful improvement in the machine for raising Water for propelling Machinery, and for other purposes which is described as follows This Machine consists of a shaft around which is constructed a double threaded screw, and outside of this screw a tight drum or barrel forming continuous spiral tubes from one end of the shaft to the other similar to the common Archimedian screw having apertures at the lower end on the side for introducing water and apertures at the upper end for discharging it The shaft is placed in a current or in tide water inclined at an angle of about 30, 40, or 50 degrees turning on pivots inserted into each of its ends in suitable steps or boxes constructed to receive them by means of the current or tide acting on wings of a trapezoidal form fixed in a permanent manner near the lower end of the outside barrel or case, as the shaft turns it gathers in the water at its lower end and conveys it by its rotary motion along the spiral tubes to the top where it is discharged into a reservoir. From this reservoir a portion of it may be conducted to overshot, or undershot wheels for propelling Machinery.

What I claim as my invention and which I desire to secure by Letters Patent, consists in the form of the wings or floats and the manner of securing them to the outside of the cylindrical drum or barrel acted upon by the current or tide, in the

54 manner before described for turning the machine above mentioned for raising water & keeping it in various purposes Witnesses
Wm. F. Elliot
Edward F. Cooke Geo. W. Wood 2
Sh.

396 words

Drawing made.